US010462531B2

(12) United States Patent
Lewis et al.

(10) Patent No.: US 10,462,531 B2
(45) Date of Patent: Oct. 29, 2019

(54) METHODS, SYSTEMS, AND MEDIA FOR PRESENTING AN ADVERTISEMENT WHILE BUFFERING A VIDEO

(71) Applicant: GOOGLE LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/993,527

(22) Filed: Jan. 12, 2016

(65) Prior Publication Data

US 2017/0201807 A1   Jul. 13, 2017

(51) Int. Cl.
*H04H 60/33* (2008.01)
*H04N 21/81* (2011.01)
*H04N 21/431* (2011.01)
*H04N 21/44* (2011.01)

(52) U.S. Cl.
CPC ....... *H04N 21/812* (2013.01); *H04N 21/4316* (2013.01); *H04N 21/44004* (2013.01); *H04N 21/44008* (2013.01); *H04N 21/44016* (2013.01)

(58) Field of Classification Search
CPC ....... H04N 21/44016; H04N 21/44008; H04N 21/44004; H04N 21/4316; H04N 21/812; H04N 21/4331
See application file for complete search history.

(56) References Cited

U.S. PATENT DOCUMENTS

| 8,069,262 B2 * | 11/2011 | Liu ............. H04L 29/06027 709/203 |
| 2006/0092281 A1 | 5/2006 | Herley et al. |
| 2008/0115161 A1 | 5/2008 | Kurzion |
| 2008/0288983 A1 | 11/2008 | Johnson et al. |
| 2009/0006191 A1 * | 1/2009 | Arankalle ............ G06Q 30/02 705/14.71 |
| 2009/0100331 A1 | 4/2009 | Sauve et al. |
| 2009/0106442 A1 | 4/2009 | Liu |

(Continued)

FOREIGN PATENT DOCUMENTS

| WO | 2015127465 | 8/2015 |
| WO | WO-2015/127465 A1 | 8/2015 |

OTHER PUBLICATIONS

Combined Search and Examination Report dated Jun. 20, 2017 in GB Patent Application No. 1621592.3.

(Continued)

*Primary Examiner* — Nasser M Goodarzi
*Assistant Examiner* — Patrick A Ryan
(74) *Attorney, Agent, or Firm* — Foley & Lardner LLP

(57) ABSTRACT

Systems and methods for automatically identifying non-canonical user sessions utilize demographics associated with a device identifier in comparison to demographics associated with requested content (e.g. video, website, etc.). If the demographics match above a threshold, then the session may be assumed to be canonical or associated with the original user. If the demographics of the content do not match the demographics of the user, then the session may be considered non-canonical. Upon identifying a non-canonical session, content selection based on demographics may be suspended until a timer expires or the session ends.

18 Claims, 5 Drawing Sheets

(56) References Cited

U.S. PATENT DOCUMENTS

| | | | | |
|---|---|---|---|---|
| 2010/0107191 A1* | 4/2010 | Feng | ............... | G06Q 30/02 |
| | | | | 725/32 |
| 2012/0110616 A1* | 5/2012 | Kilar | ............... | H04N 21/812 |
| | | | | 725/32 |
| 2014/0139742 A1* | 5/2014 | Krishna | ............ | H04N 21/4316 |
| | | | | 348/565 |
| 2014/0282690 A1* | 9/2014 | Keohane | ......... | H04N 21/23418 |
| | | | | 725/32 |
| 2015/0052550 A1* | 2/2015 | Kang | ............... | G06Q 30/0241 |
| | | | | 725/32 |
| 2015/0195608 A1* | 7/2015 | Kang | ............... | H04N 21/4316 |
| | | | | 725/18 |
| 2015/0326945 A1* | 11/2015 | Johnson | ............ | H04N 21/812 |
| | | | | 725/32 |

OTHER PUBLICATIONS

International Search Report and Written Opinion of the International Searching Authority dated Mar. 20, 2017 in International Patent Application No. PCT/US2016/066982.
YouTube, "Faster Loading Times for Chrome Users", gHack Tech News, Aug. 2013, pp. 1-2, available at http://www.ghacks.net/2013/08/18/youtube-faster-loading-times-for-chrome-users/.
International Preliminary Report on Patentability for PCT/US2016/066982, dated Jul. 26, 2018.
Anonymous, "YouTube: faster loading times for Chrome users—gHacks Tech News", (Aug. 18, 2013), URL: http://www.ghacks.net/2013/08/18/youtube-faster-loading-times-for-chrome-users/, (retrieved on 20170309), XP055353196.
Foreign Action other than Search Report on EP 16834066.9 dated Jul. 31, 2019.

* cited by examiner

METHODS, SYSTEMS, AND MEDIA FOR PRESENTING AN ADVERTISEMENT WHILE BUFFERING A VIDEO

TECHNICAL FIELD

The disclosed subject matter relates to methods, systems, and media for presenting an advertisement while buffering a video.

BACKGROUND

Many users enjoy watching streaming media content on their devices. For example, a user can request that a video from a video hosting service be played back on a mobile device. Additionally, the video hosting service may want to retain user interest by automatically playing a second video after the first video finishes playing. Furthermore, the video hosting service may want to present advertisements to the user. However, the time required to buffer the second video and then present an advertisement can lead to frustration for the user.

Accordingly, it is desirable to provide methods, systems, and media for presenting an advertisement while buffering a video.

SUMMARY

Methods, systems, and media for presenting an advertisement while buffering a video are provided.

In accordance with some embodiments of the disclosed subject matter, a method for presenting an advertisement while buffering a video is provided, the method comprising: determining that a first video in a sequence of videos has completed being presented in a video window on a user device; in response to determining that the first video has completed being presented, identifying a second video in the sequence of videos to be presented in the video window after presentation of the first video; transmitting video packets corresponding to the second video to the user device; presenting, within the video window on the user device, an indication of a buffer completion amount corresponding to presentation of the second video; identifying an advertisement to be presented on the user device; causing the advertisement to be presented in a portion of the video window concurrently with the indication of the buffer completion amount; in response to determining that a predetermined amount of time has elapsed, causing a selectable input that allows the advertisement to be halted from being presented to completion; determining that the selectable input has been selected on the user device; and in response to determining that the selectable input has been selected on the user device, causing presentation of the advertisement to be halted and presentation of the second video to begin in the video window.

In accordance with some embodiments of the disclosed subject matter, a system for presenting an advertisement while buffering a video is provided, the system comprising: a hardware processor that is programmed to: determine that a first video in a sequence of videos has completed being presented in a video window on a user device; in response to determining that the first video has completed being presented, identify a second video in the sequence of videos to be presented in the video window after presentation of the first video; transmit video packets corresponding to the second video to the user device; present, within the video window on the user device, an indication of a buffer completion amount corresponding to presentation of the second video; identify an advertisement to be presented on the user device; cause the advertisement to be presented in a portion of the video window concurrently with the indication of the buffer completion amount; in response to determining that a predetermined amount of time has elapsed, cause a selectable input that allows the advertisement to be halted from being presented to completion; determine that the selectable input has been selected on the user device; and in response to determining that the selectable input has been selected on the user device, cause presentation of the advertisement to be halted and presentation of the second video to begin in the video window.

In accordance with some embodiments of the disclosed subject matter, a non-transitory computer-readable medium containing computer executable instructions that, when executed by the processor, cause the processor to perform a method for presenting an advertisement while buffering a video is provided. The method comprises: determining that a first video in a sequence of videos has completed being presented in a video window on a user device; in response to determining that the first video has completed being presented, identifying a second video in the sequence of videos to be presented in the video window after presentation of the first video; transmitting video packets corresponding to the second video to the user device; presenting, within the video window on the user device, an indication of a buffer completion amount corresponding to presentation of the second video; identifying an advertisement to be presented on the user device; causing the advertisement to be presented in a portion of the video window concurrently with the indication of the buffer completion amount; in response to determining that a predetermined amount of time has elapsed, causing a selectable input that allows the advertisement to be halted from being presented to completion; determining that the selectable input has been selected on the user device; and in response to determining that the selectable input has been selected on the user device, causing presentation of the advertisement to be halted and presentation of the second video to begin in the video window.

In accordance with some embodiments of the disclosed subject matter, a system for presenting an advertisement while buffering a video is provided, the system comprising: means for determining that a first video in a sequence of videos has completed being presented in a video window on a user device; in response to determining that the first video has completed being presented, means for identifying a second video in the sequence of videos to be presented in the video window after presentation of the first video; means for transmitting video packets corresponding to the second video to the user device; means for presenting, within the video window on the user device, an indication of a buffer completion amount corresponding to presentation of the second video; means for identifying an advertisement to be presented on the user device; means for causing the advertisement to be presented in a portion of the video window concurrently with the indication of the buffer completion amount; in response to determining that a predetermined amount of time has elapsed, means for causing a selectable input that allows the advertisement to be halted from being presented to completion; means for determining that the selectable input has been selected on the user device; and in response to determining that the selectable input has been selected on the user device, means for causing presentation of the advertisement to be halted and presentation of the second video to begin in the video window.

In some embodiments, the system further comprises: means for determining that the selectable input has not been selected on the user device and that presentation of the advertisement has finished; and in response to determining that the selectable input has not been selected and that presentation of the advertisement has completed, means for causing presentation of the second video to begin in the video window.

In some embodiments, the system further comprises: means for determining that the advertisement has been selected on the user device; means for identifying a second advertisement to be presented on the user device; and means for causing the second advertisement to be presented in a second video window on the user device concurrently with presentation of the second video in the video window.

In some embodiments, the advertisement is a video advertisement.

In some embodiments, the system further comprises: means for presenting a group of advertising campaign options in connection with the indication that the video will be presented; means for receiving a selection of one of the advertising campaign options from the user device; and means for identifying the advertisement based on the received selection.

In some embodiments, the means for identifying the advertisement further comprises means for identifying an advertisement that can be muted for at least a portion of the advertisement.

In some embodiments, the means for identifying the advertisement further comprises means for identifying an advertisement that can be minimized for at least a portion of the advertisement.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for presenting an advertisement while buffering a video are provided.

In some embodiments, the mechanisms described herein can present an advertisement while a video is being buffered. In some embodiments, the video can be a second video that is to be presented automatically, without user input, after presentation of a first video. For example, in some embodiments, the second video can be identified based on the first video (e.g., the next episode in a series, a related video, and/or identified based on any other suitable information). As another example, in some embodiments, the second video can be a subsequent video in a playlist. In some embodiments, the advertisement can be presented concurrently on a screen with an indication that the second video is being buffered and will begin playing automatically.

In some embodiments, after beginning presentation of the advertisement, the mechanisms can determine that the second video is to be presented. For example, in some embodiments, the mechanisms can determine that the second video is to be presented after the advertisement has been presented for more than a predetermined duration of time and/or has been presented in its entirety. As another example, in some embodiments, the mechanisms can determine that the second video is to be presented in response to receiving a user input indicating that the advertisement is to be skipped over.

In some embodiments, the advertisement can include any suitable type of content, such as video content, audio content, images, text, hyperlinks, animations, and/or any other suitable type of content. In some embodiments, the mechanisms can identify the advertisement to be presented based on a type of advertisement that is to be presented.

Note that, although described herein as presenting an advertisement while a video is being buffered, the processes and mechanisms described herein can be used to present an advertisement while any suitable type of media content (e.g., video content, audio content, television programs, radio programs, audio books, and/or any other suitable type of media content) is being retrieved. Additionally, note that, although the video is described herein as automatically initiating playback, in some embodiments, the mechanisms described herein can be used to present an advertisement while a video selected by a user is being retrieved.

Figure 1A:
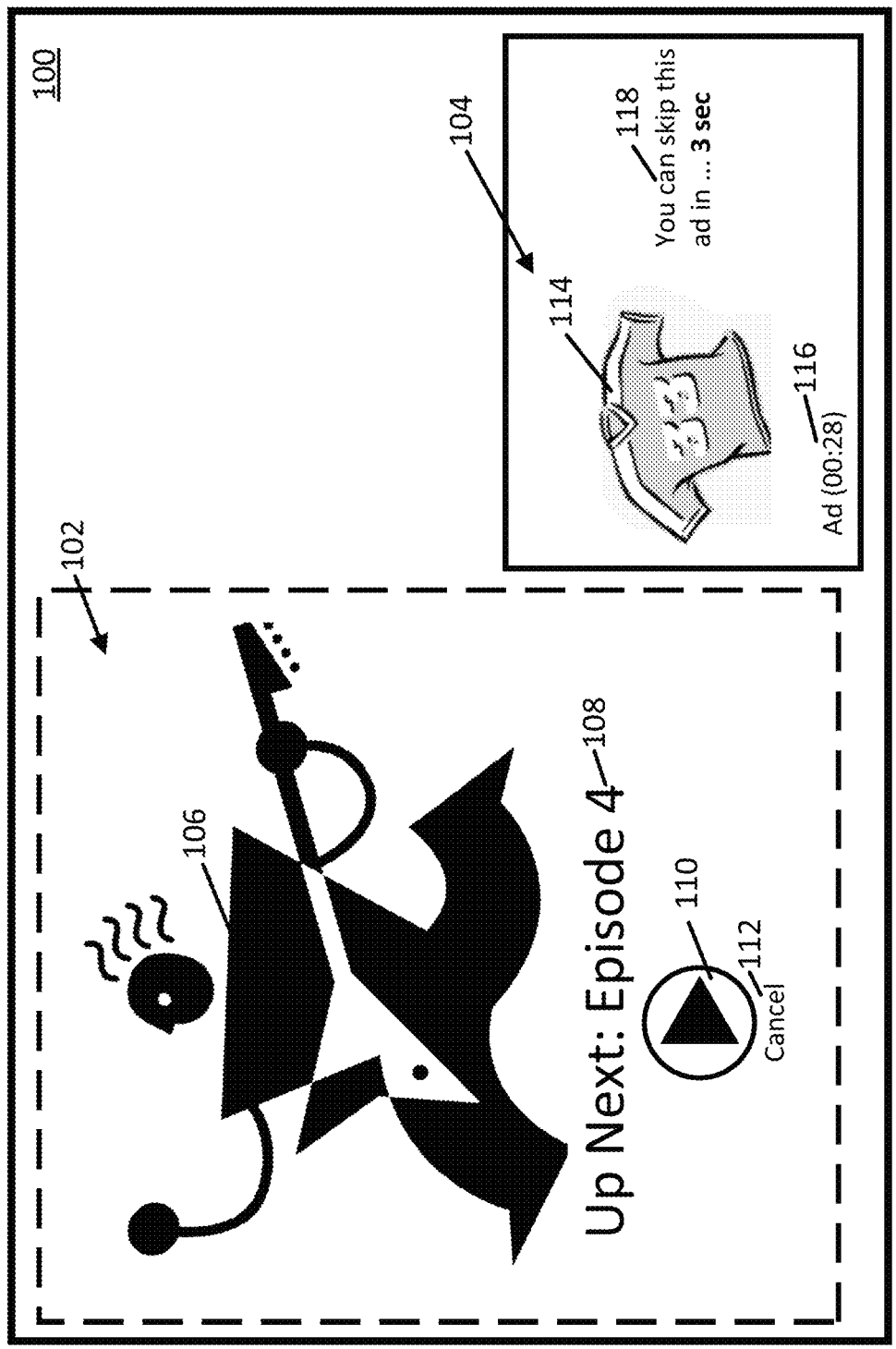
FIG. 1A shows an example of a user interface for presenting a video advertisement while buffering a video in accordance with some embodiments of the disclosed subject matter.

Turning to FIG. 1A, an example 100 of a user interface for presenting a video advertisement while buffering a video is shown in accordance with some embodiments of the disclosed subject matter. As illustrated, in some embodiments, user interface 100 can include an indication 102 of the video to be presented and an advertisement 104.

Indication 102 can be any suitable indicator of a video that will begin being automatically presented without user input. In some embodiments, the video can be downloading and being stored in memory on the user device that is to present the video while indication 102 is being presented, as shown in and described below in connection with FIG. 4. As shown in FIG. 1A, indication 102 can include image 106, title 108, play input 110, and cancel input 112.

Image 106 can be any suitable image indicating the video that is to be presented. For example, in some embodiments, image 106 can include a screen capture from a frame of a video to be presented, an image representing a character associated with the video, an image representing a creator of the video, and/or any other suitable image. In some embodiments, image 106 can be omitted.

Title 108 can be any suitable indicator and/or identifier of the video that is to be presented. For example, in some embodiments, title 108 can indicate a name of the video, a creator of the video, and/or any other suitable information. Additionally or alternatively, in some embodiments, title 108 can indicate that the video will begin being presented automatically without user input. For example, in some embodiments, title 108 can indicate an amount of time before the video will begin being presented. As a more particular example, in some embodiments, title 108 can include a countdown that indicates the amount of time before the video begins. As another more particular example, in some embodiments, title 108 can include a graphical icon and/or animation that indicates the amount of time before the video begins. In some embodiments, title 108 can be omitted.

Although in some embodiments, the video will begin being presented automatically without user input, in some embodiments, selection of play input 110 can cause the video to begin being presented. Play input 110 can be any suitable selectable user interface control, such as a selectable icon, a push button, and/or any other suitable user interface control. In some embodiments, play input 110 can be omitted. In some embodiments, play input 110 can be used to indicate an estimate or percentage estimate of how much buffering remains before the video will begin presentation.

Cancel input 112 can be any suitable selectable input that, when selected, causes the video to not be automatically presented. For example, in some embodiments, selection of cancel input 112 can cause any suitable page to be presented (e.g., presenting a list of other available media content, and/or any suitable page). In some embodiments, cancel input 112 can be omitted.

In some embodiments, advertisement 104 can include a video 114, an advertisement indicator 116, and/or a skip advertisement indicator 118.

Video 114 can be any suitable video advertisement of any suitable duration. In some embodiments, video 114 can be presented in a video player window, which can include any suitable controls (e.g., a pause control, a volume control, and/or any other suitable controls). In some embodiments, the video player window can additionally or alternatively include controls to minimize the video player window and/or mute audio associated with the video.

Advertisement indicator 116 can be any suitable indicator that video 114 is an advertisement, and can additionally or alternatively indicate a duration of video 114, as shown in FIG. 1A. In some embodiments, advertisement indicator 116 can indicate an entity associated with the advertisement (e.g., a name of a company, a name of a product, and/or any other suitable information). In some embodiments, advertisement indicator 116 can be omitted.

Skip advertisement indicator 118 can be any suitable indicator of a duration of time remaining before the advertisement can be terminated. For example, in some embodiments, skip advertisement indicator 118 can include a countdown of time remaining (e.g., "3 seconds," "2 seconds," "1 second," and/or any other suitable time) before the advertisement can be skipped as shown in FIG. 1A. In some embodiments, skip advertisement indicator 118 can become selectable after the duration of time has elapsed. For example, in some embodiments, after the duration of time has elapsed, selection of skip advertisement indicator 118 can cause the advertisement to no longer be presented, and can cause any other suitable screen and/or page to be presented (e.g., can cause the video to begin being presented, and/or any other suitable screen and/or page), as described below in connection with FIG. 4.

Figure 1B:
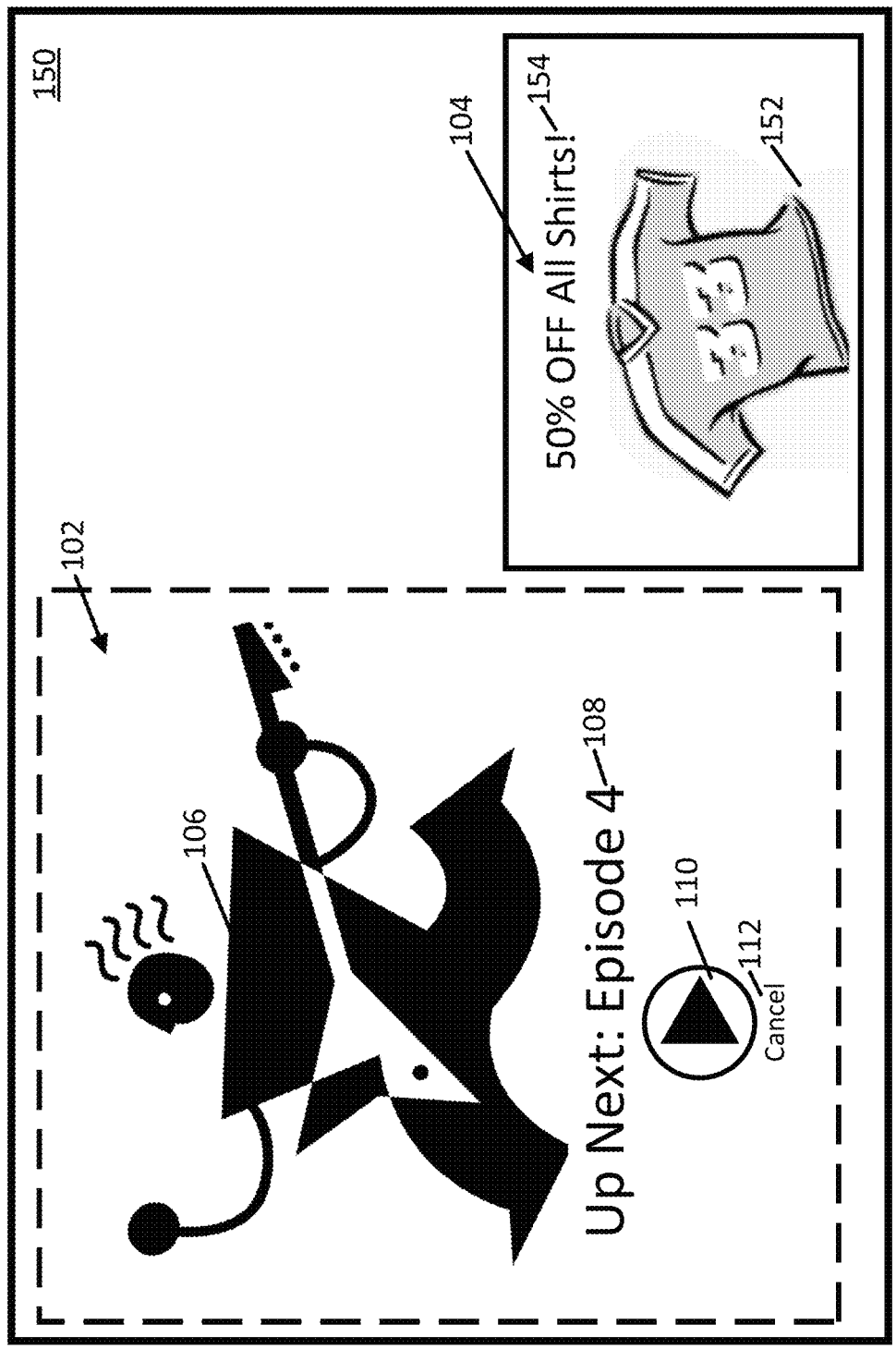
FIG. 1B shows an example of a user interface for presenting an advertisement while buffering a video in accordance with some embodiments of the disclosed subject matter.

FIG. 1B shows an example 150 of a user interface for presenting an advertisement containing an image and text while a video is being buffered in accordance with some embodiments of the disclosed subject matter. As illustrated, in some embodiments, advertisement 104 can include an image 152 and text 154.

Image 152 can include any suitable images, graphics, animations, icons, and/or any other suitable content. Text 154 can include any suitable text, hyperlinks, and/or any other suitable content. In some embodiments, image 152 and/or text 154 can be omitted.

Figure 2:
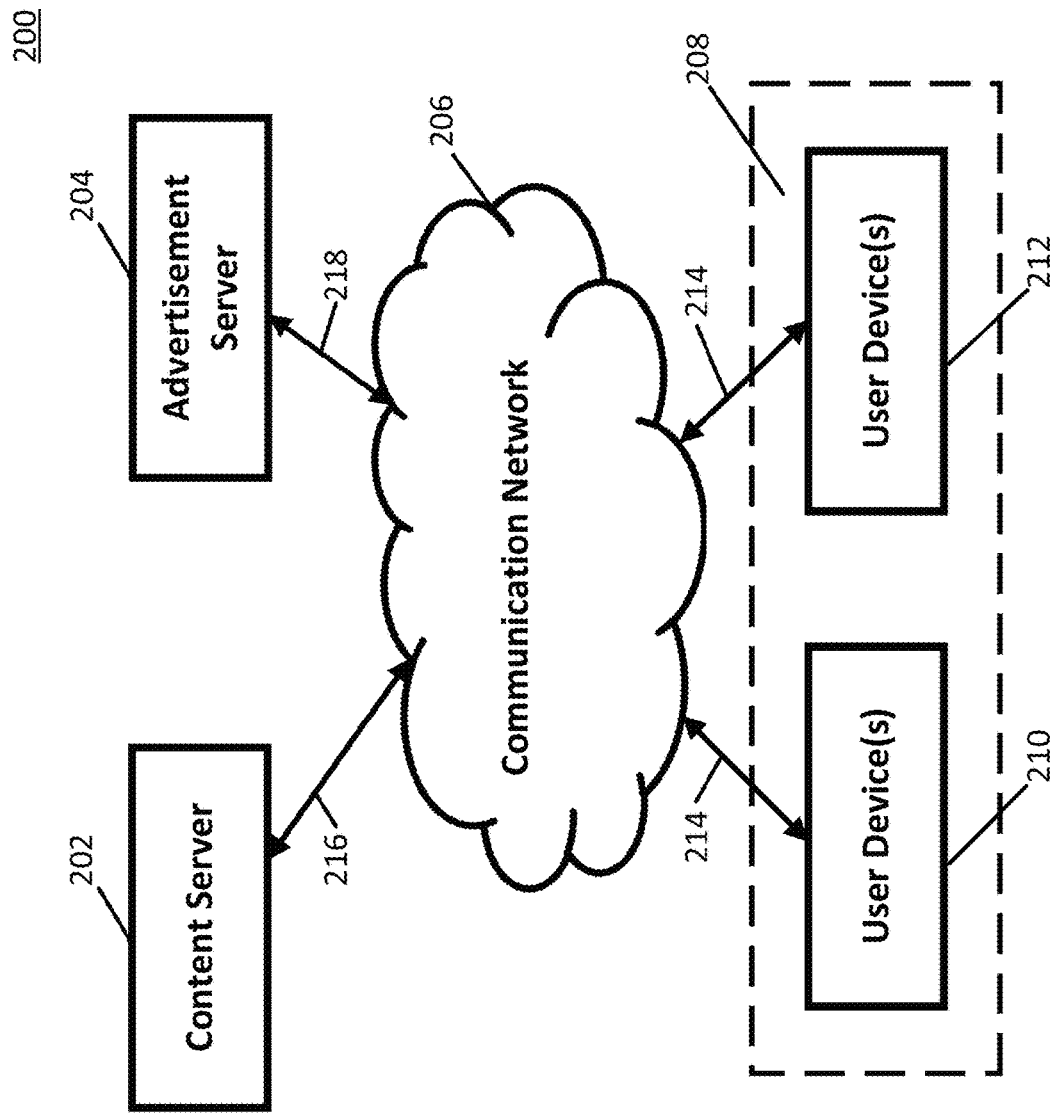
FIG. 2 shows a schematic diagram of an illustrative system suitable for implementation of mechanisms described herein for presenting an advertisement while buffering a video in accordance with some embodiments of the disclosed subject matter.

Turning to FIG. 2, an example 200 of hardware for presenting an advertisement while buffering a video that can be used in accordance with some embodiments of the disclosed subject matter is shown. As illustrated, hardware 200 can include one or more servers such as a content server 202 and an advertisement server 204, as well as a communication network 206, and/or one or more user devices 208, such as user devices 210 and 212.

In some embodiments, content server 202 can be any suitable server for storing media content and/or delivering such media content to user device 208. For example, content server 202 can be a server that streams and/or otherwise transmits media content to user device 208 via communication network 206. Media content provided by content server 202 can be any suitable content, such as video content, audio content, electronic books, documents, images, and/or any other suitable type of media content. As a more particular example, media content can include television programs, movies, cartoons, sound effects, live-streamed content (e.g., a streaming radio show, a live concert, and/or any other suitable type of streaming live content), and/or any other suitable type of media content. Media content can be created and/or uploaded to content server 202 by any suitable entity. For example, in some embodiments the media content can include user-generated content. As another example, in some embodiments, the media content can include content created and/or uploaded by a particular group and/or channel. In some embodiments, content server 202 can be omitted.

In some embodiments, advertisement server 204 can be any suitable server for storing and/or delivering advertisements to user device 208. For example, in some embodiments, advertisement server 204 can be a server that streams and/or otherwise transmits video and/or audio advertisements to user device 208 via communication network 206. As another example, in some embodiments, advertisement server 204 can transmit images and/or text advertisements to user device 208 via communication network 206. Advertisements provided by advertisement server 204 can include any suitable content, such as video content, audio content, images, text, animations, icons, hyperlinks, and/or any other suitable content. In some embodiments, advertisements can be created by any suitable entity. Additionally, in some embodiments, advertisements can be stored in association with any suitable keywords, which can indicate content of the advertisement (e.g., a name of an entity associated with the advertisement, and/or any other suitable content), products associated with the advertisement (e.g., a type of product and/or service associated with the advertisement), suitable target audiences for the advertisement (e.g., demographic information associated with a target audience, and/or any other suitable information), cost information associated with the advertisement (e.g., a payment amount associated with presentation of the advertisement, and/or any other suitable information) and/or any other suitable information. In some embodiments, advertisement server 204 can be omitted.

Communication network 206 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 208 can be connected by one or more communications links 214 to communication network 206 that can be linked via one or more communications links (e.g., communications links 216 and/or 218) to content server 202 and data server 204. Communications links 214, 216, and/or 218 can be any communications links suitable for communicating data among user devices 208 and servers 202 and/or 204 such as network links, dial-up links, wireless links, hard-wired links, any other suitable communications links, or any suitable combination of such links.

In some embodiments, user devices 208 can include one or more computing devices suitable for presenting videos, presenting advertisements, and/or any other suitable functions. For example, in some embodiments, user devices 208 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 208 can be implemented as a non-mobile device such as a desktop computer, a set-top box, a television, a streaming media player, a game console, and/or any other suitable non-mobile device.

Although content server 202 and advertisement server 204 are illustrated as separate devices, the functions performed by content server 202 and advertisement server 204 can be performed using any suitable number of devices in some embodiments. For example, in some embodiments, the functions performed by either of content server 202 and advertisement server 204 can be performed on a single server. As another example, in some embodiments, multiple devices can be used to implement the functions performed by content server 202 and/or advertisement server 204.

Although two user devices 210 and 212 are shown in FIG. 2, any suitable number of user devices, and/or any suitable types of user devices, can be used in some embodiments.

Figure 3:
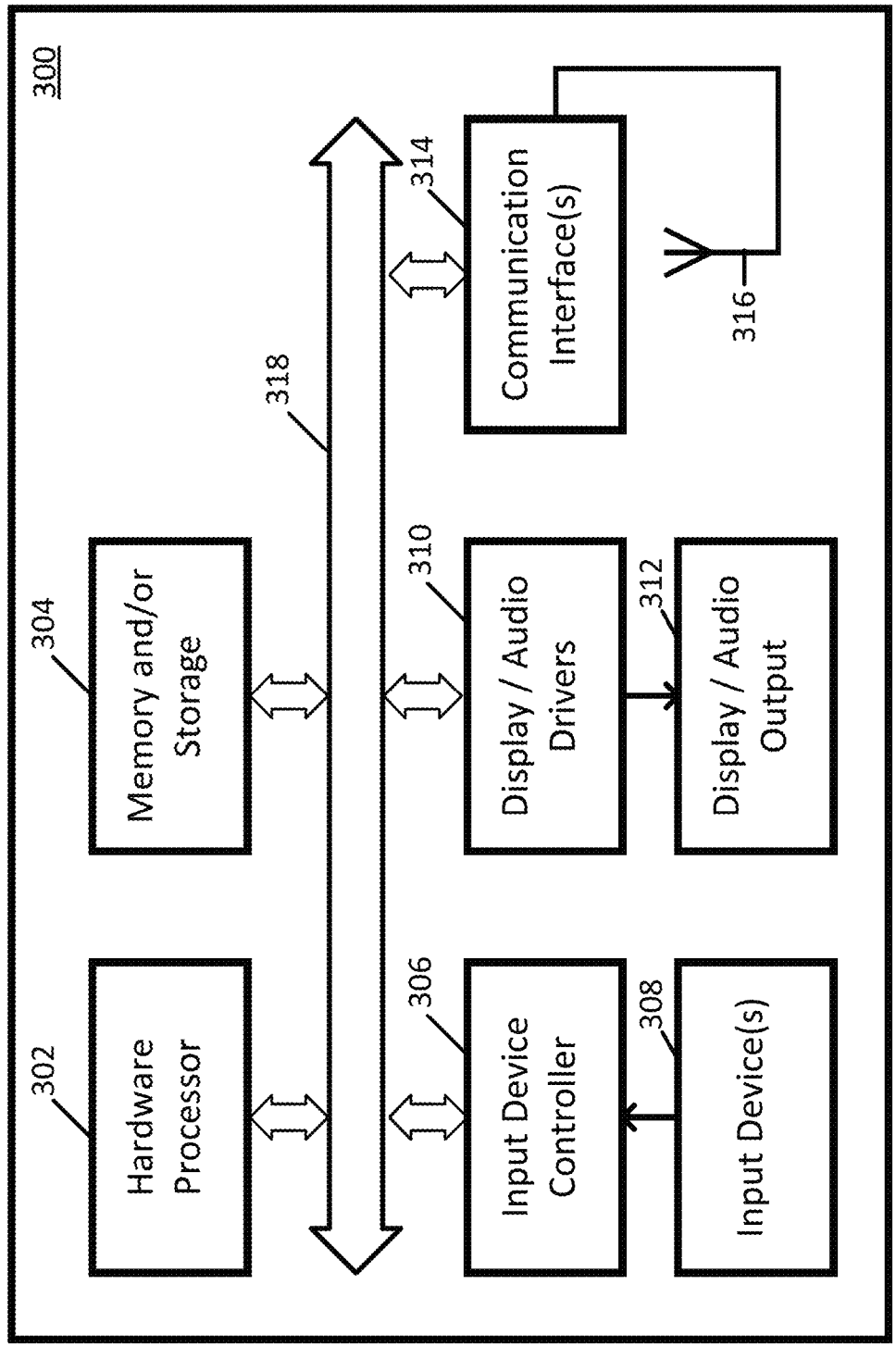
FIG. 3 shows a detailed example of hardware that can be used in a server and/or a user device of FIG. 2 in accordance with some embodiments of the disclosed subject matter.

Content server 202, advertisement server 204, and user devices 208 can be implemented using any suitable hardware in some embodiments. For example, in some embodiments, devices 202, 204, and 208 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202 and 204). For example, the server program can cause hardware processor 302 to identify an advertisement to be presented on user device 208, transmit an advertisement and/or a video to user device 208, and/or perform any other suitable actions. In some embodiments, hardware processor 302 can be controlled by a computer program stored in memory and/or storage 304 of user device 208. For example, the computer program can cause hardware processor 302 to store a received advertisement and/or a received video in memory 304, present a received advertisement and/or video, receive an indication that an advertisement is to be skipped, and/or perform any other suitable actions.

Memory and/or storage 304 can be any suitable memory and/or storage for storing programs, data, media content, advertisements, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 206 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 206) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
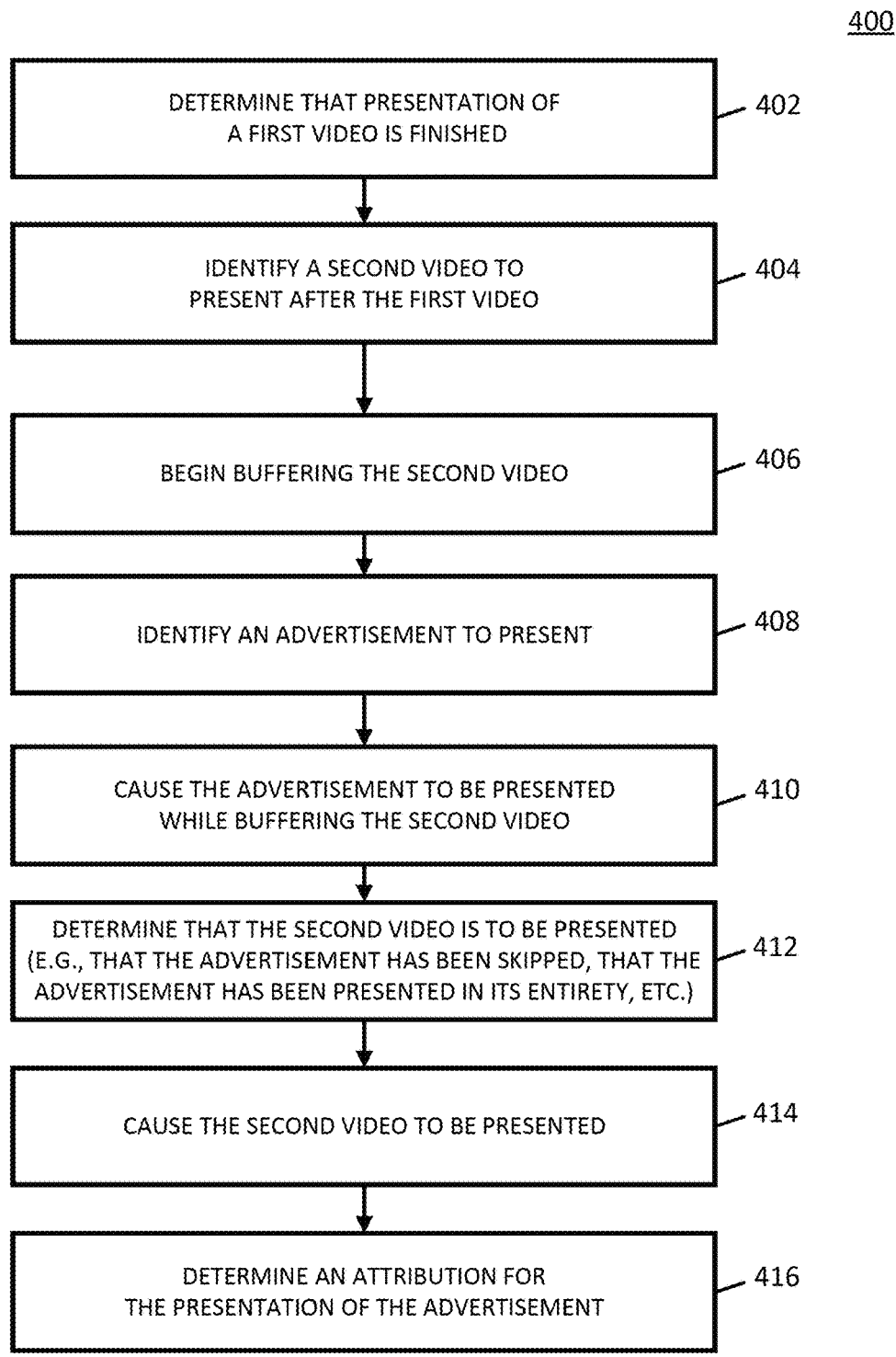
FIG. 4 shows an example of a process for presenting an advertisement while buffering a video in accordance with some embodiments of the disclosed subject matter.

Turning to FIG. 4, an example 400 of a process for presenting an advertisement while a video is being buffered is shown in accordance with some embodiments of the disclosed subject matter. In some embodiments, blocks of process 400 can be implemented on content server 202, advertisement server 204, and/or user device 208. Note that, although process 400 describes presenting an advertisement while a video is being buffered, in some embodiments, the advertisement can be presented while any suitable content (e.g., a movie, a television program, live-streamed video and/or audio content, a radio program, and/or any other suitable content) is being buffered.

Process 400 can begin by determining that presentation of a first video on user device 208 has been completed or has otherwise advanced to the end of the first video at 402. For example, in some embodiments, process 400 can determine that the first video has been fully presented. Additionally or alternatively, in some embodiments, process 400 can determine that less than a predetermined duration of time (e.g., less than ten seconds, less than five seconds, and/or any other suitable duration of time) remains to be presented of the first video. Process 400 can determine that the presentation of the first video has finished and/or is about to be finished using any suitable technique or combination of techniques. For example, in some embodiments, process 400 can determine that all of the first video has been transmitted from content server 202 to user device 208. As another example, in some embodiments, process 400 can compare a time stamp of a currently being presented portion of the first video to a duration of the first video. In some embodiments, process 400 can receive this information from the video player (e.g., from a screenshot from the video player, from a request transmitted to the video player, and/or in any other suitable manner).

Process 400 can identify a second video to present after the first video at 404. In some embodiments, the second video can be one that is to begin being presented automatically without user input. For example, in some embodiments, the first and second videos can be in a playlist of videos, and the second video can be identified as the video to be presented after completing playback of the first video. As another example, in some embodiments, the second video can be related to the first video (e.g., by topic, by keyword, and/or in any other suitable manner). As a more particular example, in instances where the first video is a member of an episodic series (e.g., a television series, a podcast, and/or any other suitable type of content), the second video can be the next episode in the series. As another more particular example, in some embodiments, the second video can be a video that is frequently (e.g., by more than a predetermined number of viewers, by more than a predetermined proportion of viewers, and/or any other suitable metric) viewed after the first video. As yet another more particular example, in some embodiments, the second video can be associated with the same channel and/or creator as the first video.

Process 400 can begin buffering the identified second video at 406 using any suitable technique or combination of techniques. For example, in some embodiments, process 400 can cause video packets corresponding to the second video to be transmitted to user device 208, and user device 208 can store the received video packets in memory 304. In some such embodiments, process 400 can cause chunks of video packets of any suitable size to be transmitted to user device 208. In some embodiments, process 400 can cause an indication of the amount of video that has been buffered and/or an amount of video that remains to be buffered on a user interface. For example, in some embodiments, process 400 can cause an icon to be presented, and the icon can be modified in any suitable manner to indicate the amount of video that has been buffered (e.g., the color of the icon can change, an outline can be created around the icon, and/or any other suitable change in presentation).

Process 400 can identify an advertisement to be presented at 408 using any suitable information. For example, in some embodiments, process 400 can identify the advertisement based on a demographic associated with the first video and/or the second video. As a more particular example, process 400 can determine a demographic (e.g., an age range, and/or any other suitable demographic information) associated with typical viewers of the first video and/or the second video, and can identify an advertisement associated with the demographic. Note that, in some embodiments, demographic information can be aggregated across a group of users. For example, in some embodiments, demographics associated with the group of users who watched a particular video can be collected to determine demographics associated with a typical viewer. In some embodiments, process 400 can use keywords stored in association with the advertisement (e.g., on advertisement server 204, and/or at any other suitable location) to identify the advertisement. For example, in some embodiments, the keywords can include information indicating a target audience.

As another example, in some embodiments, process 400 can identify the advertisement based on a type of advertisement to be delivered. As a more particular example, in some embodiments, types of advertisements can include video advertisements, still images, text advertisements, companion advertisements to be displayed next to a video player window, advertisements that can be skipped, advertisements that cannot be skipped, and/or any other suitable type of advertisement. As another more particular example, in some embodiments, process 400 can identify advertisements that can be minimized and/or muted for a predetermined duration of time (e.g., the first ten seconds, for the entire advertisement, and/or any other suitable duration of time). In some embodiments, process 400 can determine the type of advertisement to be delivered and can identify one or more advertisements of that type, for example, by searching and/or querying advertisement server 204. In some embodiments, the type of advertisement can be specified by a creator of the first video, a creator of the second video, and/or by any other suitable entity.

Process 400 can cause the advertisement to be presented on user device 208 while the second video is being buffered at 410. The advertisement can be presented using any suitable technique or combination of techniques. For example, in some embodiments, advertisement server 204 can transmit the advertisement to user device 208 via communication network 206. Note that, in some embodiments, user device 208 can buffer both the advertisement and the second video simultaneously.

Process 400 can cause the advertisement to be presented in any suitable manner. For example, in some embodiments, the advertisement can be presented inset in a user interface that indicates that the second video is currently being buffered, as shown in and described above in connection with FIGS. 1A and 1B. In some embodiments, the advertisement can additionally include an indication of a duration of time remaining until the user is allowed to skip the remainder of the advertisement.

As described above in connection with block 408, the advertisement can include any suitable content, such as video content, audio content, an image, text, hyperlinks, and/or any other suitable content. Additionally or alternatively, in some embodiments, the advertisement can be skipped and/or dismissed with user input after the advertisement has been presented for a predetermined duration of time, as shown in and described above in connection with FIG. 1A. In some embodiments, the advertisement can be presented with user interface controls that allow video associated with the advertisement to be minimized and/or audio associated with the advertisement to be muted. Additionally or alternatively, in some embodiments, the advertisement can be maximized and presented on a full screen (e.g., a full screen of a video player window, a full screen of a monitor, and/or any other suitable full screen). For example, in some embodiments, the advertisement can be maximized in response to determining that the advertisement has not been dismissed within a predetermined duration of time (e.g., within ten seconds, within twenty seconds, and/or any other suitable duration of time).

In some embodiments, a second advertisement can be presented at any suitable time and in any suitable manner. For example, in some embodiments, the second advertisement can be presented in response to determining that the first advertisement has been selected and/or interacted with in any suitable manner. As a more particular example, in some such embodiments, process 400 can identify the second advertisement (e.g., by identifying an advertisement related to the first advertisement, and/or based on any other suitable information), and can cause the second advertisement to be presented in a new tab and/or window on the user device. Note that, in some embodiments, the second advertisement can be selected based on information indicating that the second advertisement can be muted and/or minimized. As another example, in some embodiments, the second advertisement can be presented concurrently with the first advertisement. As a more particular example, in some embodiments, the first advertisement can be a video advertisement presented in a video player window that includes the indication that the second video is being buffered, and the second advertisement can be outside of the video player window (e.g., a static advertisement next to the video player window, and/or any other suitable type of advertisement). As yet another example, in some embodiments, the second advertisement can be presented after the first advertisement. As a more particular example, in instances where the first advertisement is a video advertisement, the second advertisement can be presented after the first advertisement has finished playing. As another more particular example, in instances where the first advertisement has been skipped over (e.g., due to user input), the second advertisement can begin after the first advertisement has been skipped. In some embodiments, any suitable number (e.g., one, two, five, and/or any other suitable number) of advertisements can be presented. Note that, in some embodiments, if more than a predetermined number (e.g., more than two, more than three, more than five, and/or any other suitable number) of advertisements have been skipped (e.g., due to user input), process 400 can determine that no more advertisements are to be shown, and process 400 can begin playing the second video.

Note that, in some embodiments, process 400 can cause an interactive display that allows a user to select a particular advertising campaign to be presented at 410. For example, in some embodiments, the interactive display can present a group of advertisement options (e.g., for different products, for different companies, and/or any other suitable advertising campaigns), and a user input selecting of the advertisement options can be received. In such embodiments, the interactive display can be presented while the second video is being buffered. Furthermore, in some such embodiments, advertisements associated with the selected advertising campaign can be presented as pre-roll and/or post-roll advertisements associated with the second video.

Process 400 can determine that the second video is to be presented at 412 based on any suitable information. For example, in some embodiments, process 400 can determine that the second video is to be presented based on information related to the advertisement. As a more particular example, in some embodiments, process 400 can determine that user input indicating that the advertisement is to be skipped has been received. As another more particular example, in some embodiments, process 400 can determine that the advertisement has been presented for more than a predetermined duration of time (e.g., more than five seconds, more than ten seconds, more than thirty seconds, and/or any other suitable duration of time) and/or that the advertisement has been presented in its entirety.

As another example, in some embodiments, process 400 can determine that the second video is to be presented based on information related to the second video. As a more particular example, in some embodiments, process 400 can determine that a selectable input to begin presenting the second video has been selected, as shown in and described above in connection with FIG. 1A. As another more particular example, in some embodiments, process 400 can determine that a predetermined amount of video (e.g., a fixed amount of video stored in memory, a fixed duration of video, a fixed number of frames of video, and/or any other suitable predetermined amount) has been buffered. Note that, in some embodiments, process 400 can determine the predetermined amount of video to be buffered before presentation of the second video is to begin based on any suitable factors, such as a type of device that is to present the video, a type of connection (e.g., a WiFi connection, a mobile broadband connection such as LTE, 3G, and/or any other mobile broadband connection, a DSL connection, a dial-up connection, and/or any other type of data connection), the time of day (e.g., morning, evening, and/or any other suitable time), and/or any other suitable factors.

Process 400 can cause the second video to begin being presented on user device 208 at 414 in any suitable manner. For example, in some embodiments, process 400 can cause the second video to be presented in the video player window in which the first video was presented. Note that, in some embodiments, presentation of the advertisement can continue after presentation of the second video begins. For example, in some embodiments, process 400 can receive an input from the user device indicating that a user of the user device is interacting with the advertisement (e.g., indicating that the user has selected the advertisement, and/or interacted with the advertisement in any other suitable manner), and in response to receiving the indication, process 400 can cause the advertisement and/or a related advertisement to begin playing in another user interface and/or another screen on user device (e.g., in another tab, in another window, and/or in any other suitable other user interface or screen of the user device). As another example, in instances where the advertisement includes a still image and/or text, the advertisement can be overlaid on the presentation of the second video. In some such embodiments, the advertisement can be presented until it is dismissed (e.g., by user input). As yet another example, in some embodiments, an advertisement can be presented next to a video player window in which the second video is presented. Note that, in instances where presentation of the advertisement continues during presentation of the second video, process 400 can manage audio content associated with the advertisement and the second video in any suitable manner. For example, in some embodiments, process 400 can identify a tab and/or a window that is currently in focus, and can mute audio content associated with video content not playing in the identified in focus tab and/or window.

Process 400 can determine attribution of the advertisement at 416. For example, in some embodiments, process 400 can determine that the advertisement is to be considered a post-roll advertisement associated with the first video. As a more particular example, in instances where the advertisement is presented in its entirety but presentation of the second video does not begin (e.g., due to the user interface being dismissed, a user navigating away from the user interface in which the first video and advertisement were presented, and/or based on any other suitable information), the advertisement can be attributed as a post-roll advertisement associated with the first video. As another example, in some embodiments, process 400 can determine that the advertisement is to be considered a pre-roll advertisement associated with the second video. As a more particular example, in instances where the advertisement remains visible until an indication to skip the advertisement and/or dismiss the advertisement is received while the second video is being presented, process 400 can determine that the advertisement is to be considered a pre-roll advertisement associated with the second video. As another more particular example, in instances where an advertisement is presented in a different window and/or tab during buffering of the second video, process 400 can determine that the advertisement is to be considered a pre-roll advertisement associated with the second video. In some embodiments, process 400 can determine that the advertisement is to be attributed to both the first video and the second video. For example, in some embodiments, process 400 can determine that advertisement revenue is to be split between content creators of the first video and the second creator using any suitable proportion. Note that, in instances where a user navigates to a video other than the second video (e.g., the video that is to begin playing automatically), the advertisement can be attributed to the video that the user navigates to.

Process 400 can attribute presentation of the advertisement using any suitable techniques. For example, in some embodiments, process 400 can store an indication that the advertisement was presented in connection with the first video and/or the second video, for example, in memory 304 of advertisement server 204. In some embodiments, process 400 can determine a payment amount to be paid to an entity associated with the first video and/or the second video based on the attribution. In some embodiments, the determined payment amount can be stored in any suitable manner, for example, in memory 304 of advertisement server 204.

In some embodiments, at least some of the above described blocks of the process of FIG. 4 can be executed or performed in any order or sequence not limited to the order and sequence shown in and described in connection with the figures. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting an advertisement while buffering a video are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for disambiguating presentation of an advertisement, comprising:
   determining that a first video in a sequence of videos has completed being presented in a video window on a user device;
   in response to determining that the first video has completed being presented, identifying, based on the first video, a second video, different from the first video, in the sequence of videos to be presented in the video window after presentation of the first video;
   transmitting video packets corresponding to the second video to the user device;
   presenting, within the video window on the user device, an indication corresponding to presentation of the second video based on the transmitted video packets, the indication comprising a buffer completion amount and a skip control;
   identifying an advertisement to be presented on the user device;
   causing the advertisement to be presented in a portion of the video window concurrently with the buffer completion amount;
   in response to determining that a predetermined amount of time has elapsed, activating the skip control that allows the advertisement to be halted from being presented to completion; and
   on completion of the playback of the advertisement, determining an attribution for the advertisement to a first party associated with the first video or a second party associated with the second video, by:
      responsive to determining that the skip control has been selected on the user device, identifying the advertisement as a post-roll video associated with the first video, or
      responsive to determining that the skip control has not been selected on the user device and the advertisement has been presented to completion, identifying the advertisement as a pre-roll video associated with the second video; and transmitting, to a server for storage in memory of the server, the identification of the advertisement as one of a post-roll video associated with the first video or pre-roll video associated with the second video.

2. The method of claim 1, wherein the advertisement is a video advertisement.

3. The method of claim 1, further comprising:
presenting a group of advertising campaign options in connection with the indication that the video will be presented;
receiving a selection of one of the advertising campaign options from the user device; and
identifying the advertisement based on the received selection.

4. The method of claim 1, wherein identifying the advertisement further comprises identifying an advertisement that can be muted for at least a portion of the advertisement.

5. The method of claim 1, wherein identifying the advertisement further comprises identifying an advertisement that can be minimized for at least a portion of the advertisement.

6. A system for disambiguating presentation of an advertisement, the system comprising:
a hardware processor that is programmed to:
determine that a first video in a sequence of videos has completed being presented in a video window on a user device;
in response to determining that the first video has completed being presented, identify, based on the first video, a second video, different from the first video, in the sequence of videos to be presented in the video window after presentation of the first video;
transmit video packets corresponding to the second video to the user device;
present, within the video window on the user device, an indication corresponding to presentation of the second video based on the transmitted video packets, the indication comprising a buffer completion amount and a skip control;
identify an advertisement to be presented on the user device;
cause the advertisement to be presented in a portion of the video window concurrently with the buffer completion amount;
in response to determining that a predetermined amount of time has elapsed, activate the skip control that allows the advertisement to be halted from being presented to completion; and
on completion of the playback of the advertisement,
responsive to determining that the skip control has been selected on the user device, identify the advertisement as a post-roll video associated with the first video, or
responsive to determining that the skip control has not been selected on the user device and the advertisement has been presented to completion, identify the advertisement as a pre-roll video associated with the second video; and
transmit, to a server for storage in memory of the server, the identification of the advertisement as one of a post-roll video associated with the first video or pre-roll video associated with the second video.

7. The system of claim 6, wherein the advertisement is a video advertisement.

8. The system of claim 6, wherein the hardware processor is further programmed to:

present a group of advertising campaign options in connection with the indication that the video will be presented;
receive a selection of one of the advertising campaign options from the user device; and identify the advertisement based on the received selection.

9. The system of claim 6, wherein the hardware processor is further programmed to identify an advertisement that can be muted for at least a portion of the advertisement.

10. The system of claim 6, wherein the hardware processor is further programmed to identify an advertisement that can be minimized for at least a portion of the advertisement.

11. A non-transitory computer-readable medium containing computer executable instructions that, when executed by a processor, cause the processor to perform a method for disambiguating presentation of an advertisement, the method comprising:
determining that a first video in a sequence of videos has completed being presented in a video window on a user device;
in response to determining that the first video has completed being presented, identifying, based on the first video, a second video, different from the first video, in the sequence of videos to be presented in the video window after presentation of the first video;
transmitting video packets corresponding to the second video to the user device;
presenting, within the video window on the user device, an indication corresponding to presentation of the second video based on the transmitted video packets, the indication comprising a buffer completion amount and a skip control;
identifying an advertisement to be presented on the user device;
causing the advertisement to be presented in a portion of the video window concurrently with the buffer completion amount;
in response to determining that a predetermined amount of time has elapsed, activating the skip control that allows the advertisement to be halted from being presented to completion; and
determining an attribution for the advertisement to a first party associated with the first video or a second party associated with the second video, by:
on completion of the playback of the advertisement,
responsive to determining that the skip control has been selected on the user device, identifying the advertisement as a post-roll video associated with the first video, or
responsive to determining that the skip control has not been selected on the user device and the advertisement has been presented to completion, identifying the advertisement as a pre-roll video associated with the second video; and
transmitting, to a server for storage in memory of the server, the identification of the advertisement as one of a post-roll video associated with the first video or pre-roll video associated with the second video.

12. The non-transitory computer-readable medium of claim 11, wherein the advertisement is a video advertisement.

13. The non-transitory computer-readable medium of claim 11, wherein the method further comprises:
presenting a group of advertising campaign options in connection with the indication that the video will be presented;

receiving a selection of one of the advertising campaign options from the user device; and identifying the advertisement based on the received selection.

14. The non-transitory computer-readable medium of claim 11, wherein identifying the advertisement further comprises identifying an advertisement that can be muted for at least a portion of the advertisement.

15. The non-transitory computer-readable medium of claim 11, wherein identifying the advertisement further comprises identifying an advertisement that can be minimized for at least a portion of the advertisement.

16. The method of claim 1, wherein the advertisement is identified based on a type of advertisement associated with the advertisement.

17. The system of claim 6, wherein the advertisement is identified based on a type of advertisement associated with the advertisement.

18. The non-transitory computer-readable medium of claim 11, wherein the advertisement is identified based on a type of advertisement associated with the advertisement.

* * * * *